United States Patent [19]

Mizusaki

[11] Patent Number: 4,542,624
[45] Date of Patent: Sep. 24, 1985

[54] DIAPHRAGM ASSEMBLY

[75] Inventor: Yoshinobu Mizusaki, Nagano, Japan

[73] Assignee: Nisshin Kogyo Kabushiki Kaisha, Japan

[21] Appl. No.: 386,780

[22] Filed: Jun. 9, 1982

[30] Foreign Application Priority Data

Jun. 9, 1981 [JP] Japan .................................. 56-84806
Jun. 9, 1981 [JP] Japan ............................. 56-88475[U]

[51] Int. Cl.⁴ .............................................. F15B 7/00
[52] U.S. Cl. ...................................... 60/535; 60/592; 92/98 D
[58] Field of Search ................. 60/592, 535, 534, 585; 92/98 D

[56] References Cited

U.S. PATENT DOCUMENTS

| | | | |
|---|---|---|---|
| 2,293,854 | 8/1942 | Sauzedde | 60/592 |
| 3,354,639 | 11/1967 | Yost | 60/592 |
| 3,423,939 | 1/1969 | Lewis | 92/98.0 |
| 3,609,975 | 10/1971 | Lewis | 60/592 |
| 4,084,377 | 4/1978 | Gaiser | 60/592 |
| 4,133,178 | 1/1979 | Brooks, Sr. | 60/592 |
| 4,133,287 | 1/1979 | Downs | 60/534 |
| 4,192,345 | 3/1980 | Fujii | 60/592 |
| 4,307,815 | 12/1981 | Sakazume | 60/585 |
| 4,393,655 | 7/1983 | Komorizono | 60/592 |

FOREIGN PATENT DOCUMENTS

| | | | |
|---|---|---|---|
| 2502746 | 8/1975 | Fed. Rep. of Germany | 60/535 |
| 55-47001 | 4/1980 | Japan | 60/592 |

Primary Examiner—Abraham Hershkovitz
Attorney, Agent, or Firm—Cantor and Lessler

[57] ABSTRACT

A diaphragm assembly is designed to follow a drop in the level of a working fluid filled in a reservoir used with a master cylinder for the purpose of cutting off the communication between the working fluid and the outside air. The diaphragm includes a pair of opposite lower steps in the axial direction. Each of the steps comprises an upright flat portion and an upper flat portion which form parts of the bottom wall and side wall of the diaphragm, when the level of the working fluid in the reservoir reaches a predetermined lower limit. The upper flat portions of the steps are inclined to at a given angle to the horizontal, thus forming an air passage.

5 Claims, 8 Drawing Figures

DIAPHRAGM ASSEMBLY

BACKGROUND OF THE INVENTION

The present invention relates to a diaphragm used with a master cylinder, and more particularly to a diaphragm assembly adapted to be fitted to a reservoir so as to cut off the communication between a working fluid filled therein and the outside air.

As well-known in the art, the diaphragm of this type used with a master cylinder is fitted to a reservoir with its outer periphery being engaged with a reservoir cap and fixed to the reservoir so as to, on the one hand, prevent the working fluid from being contaminated with the atmosphere and, on the other hand, prevent any negative pressure from being generated following a drop in the level of the working fluid. To ensure that the diaphragm follows a drop in liquid level, the diaphragm is provided with a bellows portion. For instance, it has been proposed to form the diaphragm with a bellows portion in the radial direction of an associated reservoir. However, it is likely that an amount of air is confined within the spaces between the lower corrugations of the bellows portion, mixed with a working fluid due to the vibration of a vehicle body, and guided into a pressure system during braking, thereby causing a so-called vapor lock phenomeneon.

To this end, a radially opening air passage is provided through the spaces of the lower corrugations of the bellows to drive air out of the reservoir. With that air passage being flat and only passing through part of the spaces defined by the corrugated portion, however, it is impossible to remove the air confined within the said spaces in a reliable and smooth manner. Provison of the air passage to part of the bellows portion also leads possibly to the generation of a negative pressure, since the diaphragm does not satisfactorily drop to the liquid level.

To make it more reliable for the diaphragm to follow a drop in liquid level, it has also been proposed to provide the reservoir with a bellows portion in its axial direction. Owing to the absence of any air-confining space, there is no fear that air may be carried into a pressure system. However, mold making is complicated with rises in the production cost as a consequence.

With the master cylinder, difficulties would be encountered in increasing the pressure in the pressure system, if the amount of liquid in the reservoir is decreased.

To detect the amount of liquid, therefore, a viewing window(s) is provided in the reservoir in the case that it is formed of an opaque material, and united with the body of the master cylinder, or alternatively the reservoir per se is made of a transparent material.

When the diaphragm is formed with a bellows portion, however, it begins to hang down at its central tip with a decrease of the amount of a working liquid, thereby forcing the working liquid into the space between it and the inner wall of the reservoir, or closing up the window. This poses a problem in connection with the accurate dectection of a liquid level.

SUMMARY OF THE INVENTION

It is therefore a main object of the present invention to provide a solution to the above-mentioned problems.

According to the present invention, this object is achieved by the provision of a novel diaphragm assembly formed of an elastic or flexible material and including a pair of opposite lower steps in the axial direction, each of said steps comprising an upright flat portion and an upper flat portion which form parts of the bottom wall and side wall of the diaphragm, when the level of a working fluid reaches a predetermined lower limit.

A mark or the like for indicating the said predetermined lower limit is provided on the underside of each of the said upper flat portions.

To provide easy guiding of the air confined in the reservoir, the upper flat portion of each step should preferably be inclined at a given angle to the horizontal.

BRIEF DESCRIPTION OF THE DRAWINGS

The above-mentioned and other objects and features of of the present invention will become apparent from a reading of the following detailed explanation with reference to the accompanying drawings, in which.

DETAILED DESCRIPTION OF THE PREFERRED EMBODIMENTS

Figure 1:
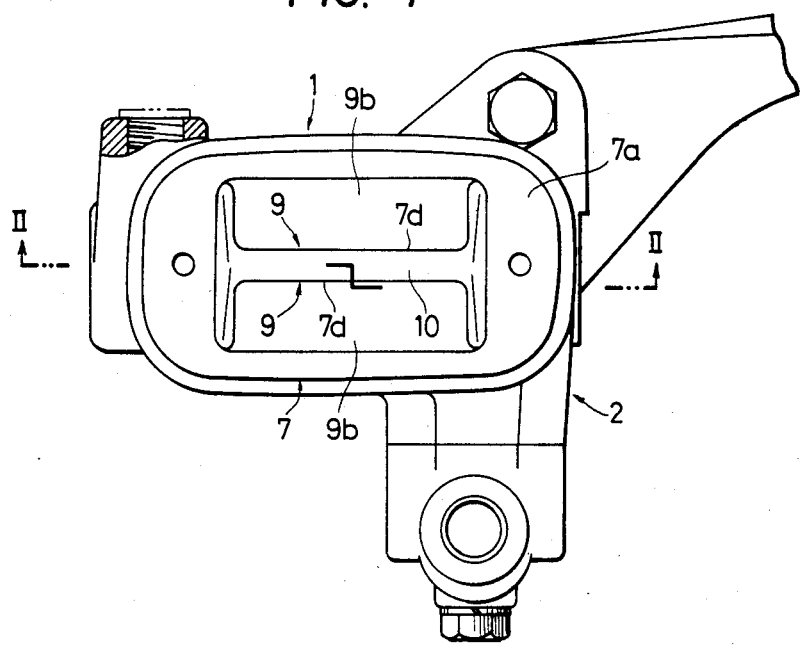
FIG. 1 is a plan view of the diaphragm according to the present invention, which is shown as being fitted to a reservoir for a master cylinder.
Figure 2:
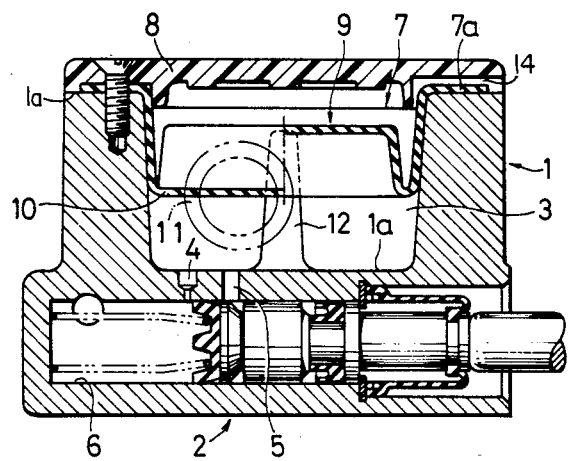
FIG. 2 is a sectional view taken along the line II—II of FIG. 1.

Referring now to FIGS. 1 through 5 inclusive, a reservoir 1 of a rectangular shape is integrally formed with a cylinder main body 2. The rectangular reservoir 1 is fed with a working fluid 3, and communicates with the liquid chambers of a cylinder 6 through a relief port 4 and a supply port 5, both ports being formed in the fluid inlet of the reservoir 1. The reservoir 1 has an outer flange 1a engaged by a reservoir cap 8 at the open top end of the reservoir 1.

Figure 4:
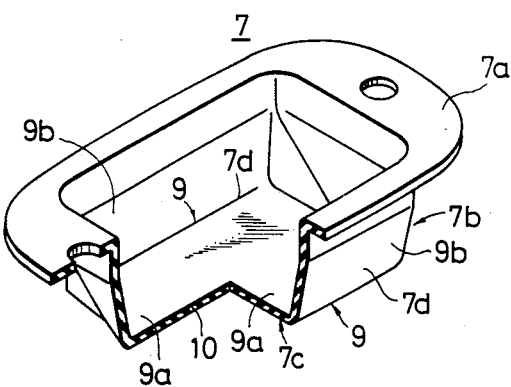
FIG. 4 is a partially sectioned, perspective view of the diaphragm, in which the steps form parts of the bottom and side walls of the diaphragm.
Figure 5:
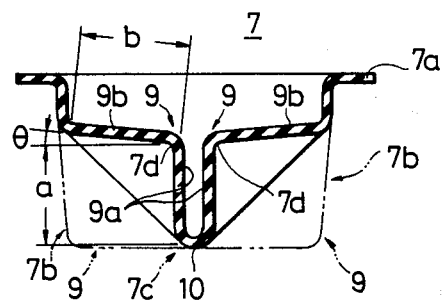
FIG. 5 is a sectional view taken along the line V—V of FIG. 3.

As shown in FIG. 4, the diaphragm 7 assumes a box-like shape corresponding to that of the reservoir 1, when a drop in the liquid level therein reaches a predetermined lower limit.

Figure 3:
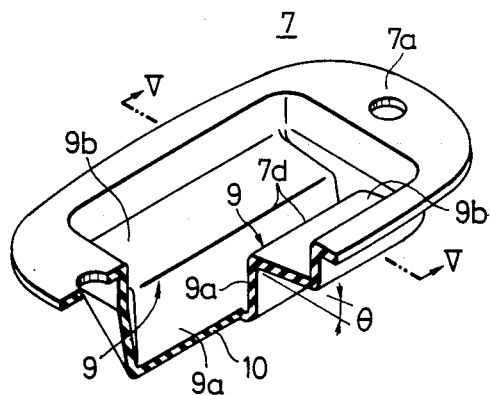
FIG. 3 is a partially sectioned, perspective view of the diaphragm of FIG. 1, which is fitted to the reservoir.

The diaphragm 7 is fitted to the reservoir 1 in the form as illustrated in FIG. 3. More specifically, the diaphragm 7 has a pair of opposite lower steps 9 along its longitudinal direction. Each step 9 comprises an upright flat portion 9a and upper flat portion 9b which form parts of the bottom wall 7c and either side wall 7b of the diaphragm 7, when the level of the working fluid reaches the lower limit in the reservoir 1. Preferably, the upper flat portion 9b is inclined at a given angle $\theta$ to the horizontal to guide the air confined to below the peripheral flange 7a of the diaphragm 7.

The diaphragm according to the present invention is bodily molded of an elastic material such as natural or synthetic rubber to such a shape as illustrated in FIG. 3.

It is understood that while the illustrated diaphragm has been described as being of a rectangular shape (FIG. 4) in cross-section, the present invention is not limited that shape, and may make use of any suitably-shaped diaphragm of the structure that meets the requirements defined in the appended claims.

In assembling, the diaphragm according to the present invention is fitted to the associated reservoir with its steps being opposed to viewing windows 11 formed in the side walls of the reservoir 1.

A level line 12 is provided on the inner wall of the reservoir 1 for the purpose of measuring an amount of the working liquid 3 fed therein.

A given amount of the working liquid 3 is filled in the reservoir 1, to which is then fitted the diaphragm 7.

The air confined within the reservoir is guided along the inclined upper flat portions of the steps 9 of the diaphragm 7 to below the peripheral flange 7a thereof. It is thus very unlikely that the working fluid 3 is mixed with the said air due to the vibration of a vehicle body.

An air passage 14 is provided between the reservoir 1 and the cover 8 to maintain the chamber above the diaphragm 7 at atmospheric pressure.

As the amount of the working fluid 3 decreases, viz, the liquid level of the working liquid drops, the upright and upper flat portions of the steps 9 are pulled down and, finally, take on the form as illustrated in FIG. 4.

The capability of the inventive diaphragm 7 to follow a drop in liquid level is increased since it is designed to take on the contours of the reservoir 1, when a drop in liquid level reaches the lower limit.

With the inventive diaphragm, it is possible to eliminate such inconveniences as caused by the prior art diaphragm formed with bellows. As already mentioned, the conventional diaphragm begins to hang down form its central tip, with the working fluid 3 being forced into the space between the diaphragm 7 and the inner wall of the reservoir 1 as a consequence. The level of the working liquid 3 can thus be detected precisely.

With the arrangement as described above, the relief and supply ports 4 and 5 are not possibly closed, since the upright and upper flat portions of the steps 9 form parts of the bottom and side walls of the diaphragm 7.

Figure 6:
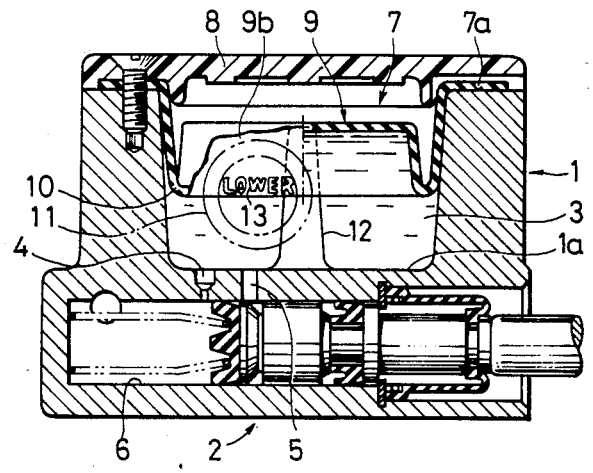
FIG. 6 is a sectional view, similar to FIG. 2, showing another embodiment of the present invention, wherein the diaphragm is provided with a mark for indicating that a drop in liquid level reaches a predetermined lower limit.
Figure 7:
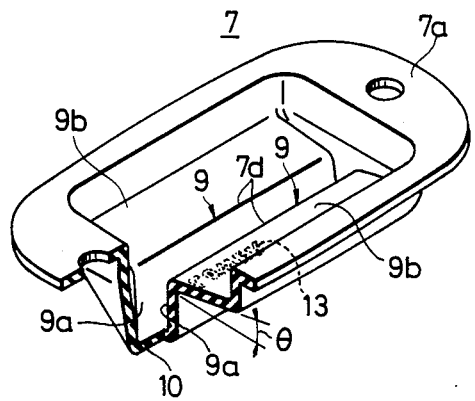
FIG. 7 is a partially sectioned, perspective view of the diaphragm fitted to a reservoir.
Figure 8:
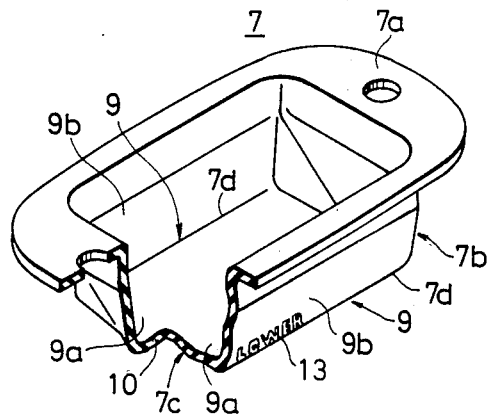
FIG. 8 is a partially sectioned, perspective view of the diaphragm, in which the steps form parts of the bottom and side walls of the diaphragm.

Referring to FIGS. 6 through 8 inclusive, there is shown another embodiment of the present invention.

The second embodiment is basically identical with the first embodiment, with the exception that a letter 13 or the like is provided on the underside of the upper flat portion 9b of each step 9 for indicating that a drop in liquid level reaches a predetermined lower limit. The mark 13 should preferably be colored to be distinguished from the diaphragm 7.

In the second embodiment, the viewing window 11 is arranged in such a manner that, when the level of the working liquid 3 reaches the lower limit, the indication 13 is displayed at the center thereof.

While, in the first and second embodiments, the diaphragm has been described as being of a generally uniform thickness, it will be understood that, to make it more reliable for the diaphragm to follow a drop in liquid level, it is recommendable to make the upright flat portion of each step 9 thinner. Preferably, but not exclusively, it is also recommended to make the width of the upright portion 9a equal to that of the upper flat portion 9b of each step 9.

A separate reservoir 1 may be formed of a transparent material, and fixed to the body 2 of a master cylinder. It is then preferable to fit the diaphragm to the reservoir in such a manner that the steps having marks 13 are positioned in front of the user.

What is claimed is:

1. In a sealed hydraulic reservoir comprising a main body having an open upper end and means at the lower end communicating with a hydraulic cylinder; a cap detachably mounted on the open upper end; and an elastic diaphragm interposed between said body and said cap to form an upper chamber which is in communication with the atmosphere and a lower chamber for containing hydraulic fluid; the improvement which comprises:

(A) said lower chamber being filled with said hydraulic fluid substantially free of an air space thereabove;

(B) said diaphragm normally comprising an upper peripheral flange; a depending peripheral wall portion; and a pair of opposed longitudinal lower steps, said lower steps each comprising a lower depending flat portion and an inclined upper flat shoulder joining said wall portion and said flat portion;

(C) said lower depending flat portions and said inclined upper flat shoulders causing any air bubbles entrapped in said fluid to rise and move outwardly along said inclined upper flat portion to escape between said upper peripheral flange and the upper end of said body; and (D) said diaphragm, being capable of following the level of the fluid as the fluid level drops to thereby assume a shape conforming to the shape of said lower chamber when the level of said fluid reaches a predetermined lower limit wherein said upper flat shoulders form a continuation of said wall portion and said depending flat portions form a bottom floor.

2. The diaphragm assembly as recited in claim 1, wherein said reservoir and said diaphragm are essentially rectangular in shape when viewed from above.

3. The diaphragm assembly as recited in claim 1, in which a mark for indicating said predetermined lower limit is provided on the underside of each of said upper flat shoulders.

4. The diaphragm assembly as recited in claim 1, in which said diaphragm is bodily molded of a rubber material.

5. The diaphragm assembly as recited in claim 1, in which the thickness of said upper flat shoulders is smaller than that of the remaining portion of said diaphragm, and in which the width of said lower depending flat portions are substantially equal to that of said upper flat shoulders.

* * * * *